US006903139B2

United States Patent
Landis et al.

(10) Patent No.: US 6,903,139 B2
(45) Date of Patent: Jun. 7, 2005

(54) PRODUCTION OF SYNTHESIS GAS FROM A FEED STREAM COMPRISING HYDROGEN

(75) Inventors: Stephen R. Landis, Katy, TX (US); Lisa M. Carmichael, Ponca City, OK (US); Kevin L. Ricketson, Ponca City, OK (US); Thomas R. Ruddy, II, Shawnee, KS (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/301,370

(22) Filed: Nov. 21, 2002

(65) Prior Publication Data

US 2004/0102531 A1 May 27, 2004

Related U.S. Application Data

(63) Continuation-in-part of application No. 10/299,193, filed on Nov. 19, 2002, now abandoned.

(51) Int. Cl.$^7$ .............................. C07C 27/00; C07C 1/02
(52) U.S. Cl. ...................... 518/703; 518/700; 518/702; 518/705; 252/373
(58) Field of Search ................................ 518/700, 702, 518/703, 705; 252/373

(56) References Cited

U.S. PATENT DOCUMENTS

| | | | |
|---|---|---|---|
| 6,329,434 B1 | * 12/2001 | Wen et al. | 518/703 |
| 6,333,294 B1 | 12/2001 | Chao et al. | 502/325 |
| 6,402,989 B1 | 6/2002 | Gaffney | 252/353 |
| 6,534,552 B2 | * 3/2003 | Benham et al. | 518/715 |
| 6,596,781 B1 | * 7/2003 | Schinski | 518/700 |

OTHER PUBLICATIONS

A. Cybulski and J.A. Moulijn (Eds.), Structured Catalysts and Reactors, Marcel Dekker, Inc., 1998, p. 599–615 (Ch. 21, X. Xu and J.A. Moulijn, Transformation of a Structured Carrier into Structured Catalyst).
A. Cybulski and J.A. Moulijn (Eds.), Structured Catalysts and Reactors, Marcel Dekker, Inc., 1998, p. 179–208 (Ch. 7, Gerald E. Voecks, Unconventional Utilization of Monolithic Catalysts for Gas–Phase Reactins)s.
Harold Gunardson, Industrial Gases In Petrochemical Processing, Marcel Dekker, Inc., 1998, p. 41–80 (Ch. 2, Synthesis Gas Manufacture).

* cited by examiner

Primary Examiner—J. Parsa
(74) Attorney, Agent, or Firm—Conley Rose P.C.

(57) ABSTRACT

Embodiments include a method and apparatus for producing synthesis gas in a catalytic partial oxidation reactor by adding hydrogen to the reactor feed stream.

26 Claims, 1 Drawing Sheet

PRODUCTION OF SYNTHESIS GAS FROM A FEED STREAM COMPRISING HYDROGEN

RELATED APPLICATIONS

This application is a continuation-in-part of application Ser. No. 10/299,193, filed Nov. 19, 2002, now is abandoned.

TECHNICAL FIELD OF THE INVENTION

The present invention relates to a process for the preparation of synthesis gas, i.e., a mixture of carbon monoxide and hydrogen, from a hydrocarbon feedstock. Particularly, the present invention relates to adding hydrogen to the feed stream of a (CPOX) partial oxidation reactor, preferably a catalytic partial oxidation reactor.

BACKGROUND OF THE INVENTION

Large quantities of natural gas are available in many areas of the world, and natural gas is predicted to outlast oil reserves by a significant margin. However, a significant amount of natural gas is situated in areas that are geographically remote from population and industrial centers. The costs of compression, transportation, and storage make its use economically unattractive. To improve the economics of natural gas use, much research has focused on the use of methane, the main component of natural gas, as a starting material for the production of higher hydrocarbons and hydrocarbon liquids, which are more easily transported and thus more economical. The conversion of methane to higher hydrocarbons or hydrocarbon liquids is typically carried out in two steps. In the first step, methane is converted into a mixture of carbon monoxide and hydrogen (i.e., synthesis gas or syngas). In a second step, the syngas is converted into the higher hydrocarbons via a process such as Fischer-Tropsch synthesis or alcohols via alcohol synthesis. An acceptable example of Fischer-Tropsch synthesis is disclosed in U.S. Pat. No. 6,333,294 to Chao et al., incorporated herein by reference.

Current industrial use of methane or natural gas as a chemical feedstock proceeds by the initial conversion of the feedstock to carbon monoxide and hydrogen by either steam reforming (the most widespread process), dry reforming, autothermal reforming, partial oxidation or catalytic partial oxidation. Examples of these processes are disclosed in Gunardson, Harold, INDUSTRIAL GASES IN PETROCHEMICAL PROCESSING 41–80 (1998), incorporated herein by reference. Steam reforming, dry reforming, and catalytic partial oxidation proceed according to the following reactions respectively:

$$CH_4 + H_2O \leftrightarrow CO + 3H_2 \quad (1)$$

$$CH_4 + CO_2 \leftrightarrow 2CO + 2H_2 \quad (2)$$

$$CH_4 + 1/2 O_2 \rightarrow CO + 2H_2 \quad (3)$$

As is shown schematically in FIG. 1, in catalytic partial oxidation, the hydrocarbon feedstock is mixed with an oxygen source, such as air, oxygen-enriched air, or oxygen, and introduced to a catalyst as syngas feed stream 10 in the CPOX reactor 1 at elevated temperature and pressure. When the feedstock comprises primarily methane, the stoichiometric $H_2$:CO molar ratio of the product of a pure CPOX reaction is 2:1. However, due to secondary reactions, the observed $H_2$:CO molar ratio in the syngas product stream 20 is generally less than the stoichiometric ratio. The downstream conversion of the syngas to higher hydrocarbons (e.g., fuels boiling in the middle distillate range, such as kerosene and diesel fuel, and hydrocarbon waxes) via the Fischer-Tropsch or other synthesis reaction may require an $H_2$:CO molar ratio greater than that observed in the syngas product stream 20. Thus, it is generally necessary to provide an additional amount of hydrogen 40 to the CPOX syngas product stream before introduction into the Fischer-Tropsch reactor 2. Examples of acceptable methods of producing and separating hydrogen are described in Gunardson at 41–110, incorporated herein by reference.

After the syngas is reacted into higher hydrocarbons (if reactor 2 is a Fischer-Tropsch reactor) or alcohols (if reactor 2 is an alcohol synthesis reactor) the gas effluent 50 is separated from the liquid product stream 30. The liquid product stream goes on for further processing (not shown). If reactor 2 is a Fischer-Tropsch reactor, the gas effluent 50 generally comprises methane, unreacted $H_2$, unreacted CO and other impurities such as $CO_2$ and other light hydrocarbons. If reactor 2 is an alcohol synthesis reactor, gas effluent generally comprises CO and $H_2$.

It would generally be desirable to eliminate or reduce the amount of supplemental hydrogen added in supplemental hydrogen stream 40. Additionally, it would be desirable to recycle a Fischer-Tropsch effluent stream rich in methane to a CPOX reactor without the need to separate hydrogen from the effluent stream.

SUMMARY OF THE PREFERRED EMBODIMENTS

In preferred embodiments of the present invention, there are shown methods and apparatus for conducting a partial oxidation reaction in a reactor having a feed stream comprising a hydrogen-containing gas that has been preferably been recycled from the FT or other area within the GTL plant, an oxygen-containing gas, and a gaseous hydrocarbon.

DETAILED DESCRIPTION OF THE PREFERRED EMBODIMENTS

Figure 2:
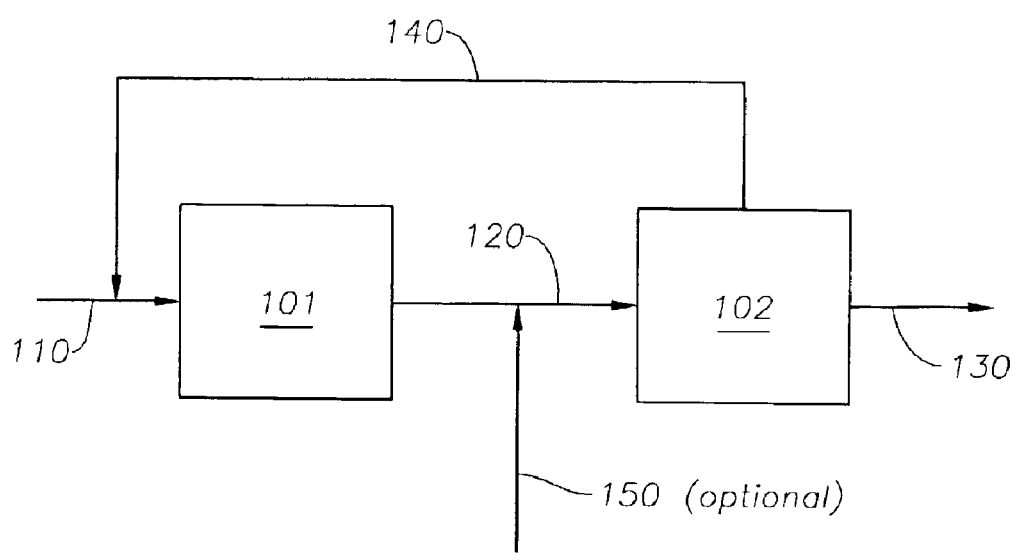
FIG. 2 is a first schematic embodiment of a CPOX/Fischer-Tropsch reaction scheme in accordance with the present invention.

In a preferred embodiment, shown in FIG. 2, a CPOX feed stream 110 comprising a hydrocarbon, preferably natural gas or methane, and an oxygen-containing gas, preferably substantially pure oxygen, oxygen-enriched air, or air, most preferably substantially pure oxygen, is mixed with the gas effluent stream 140 from the downstream Fischer-Tropsch process and fed into CPOX reactor 101 where it is subject to partial oxidation, preferably catalytic partial oxidation. Examples of acceptable catalytic partial oxidation reactions are disclosed in STRUCTURED CATALYSTS AND REACTORS 179–208 (Andrzej Cybulski & Jacob A. Moulijn eds. 1998), incorporated herein by reference, U.S. Pat. No. 6,402,989 to Gaffney, incorporated herein by reference, and Gunardson at 41–80, or any other catalytic partial oxidation as is known in the art. It has been thought in the past by those of skill in the art that it is unadvisable to add a hydrogen rich stream to a CPOX feed. The hydrogen would typically react exothermically with oxygen to form water. This would be counter to the preferred selective partial oxidation to CO and $H_2$. Secondly, it could be indeed dangerous to include hydrogen in the feed stream of a catalytic partial oxidation reaction such as in the present case. It is the conventional wisdom that due to the conditions in the reactor (e.g., high temperatures and pressures) and the presence of substantially pure oxygen that the addition of hydrogen could create a dangerous situation. Applicants have discovered this not to be the case. Applicants have discovered that instead of reacting violently, hydrogen introduced into the catalytic partial oxidation reactor passes through substantially unchanged.

Figure 1:
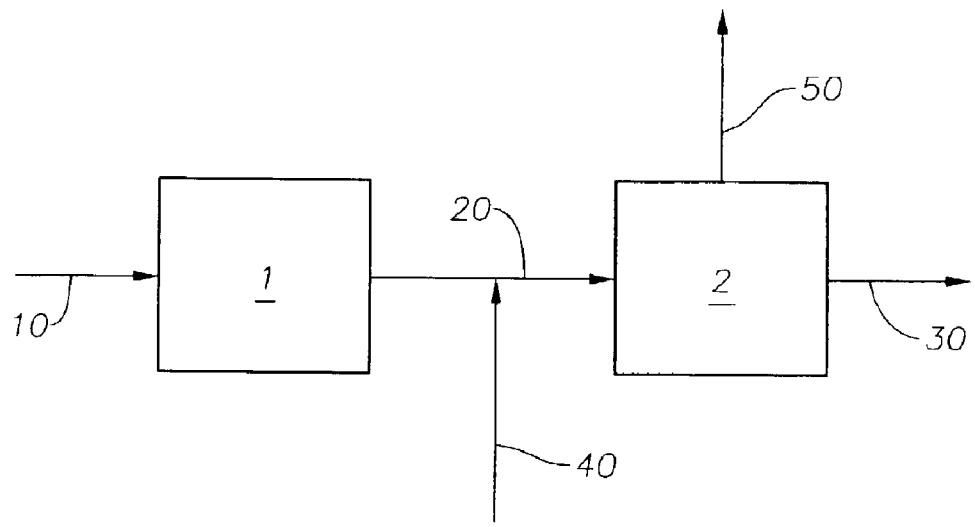
FIG. 1 is a schematic embodiment of a conventional CPOX/Fischer-Tropsch reaction scheme.

Even with the hydrogen in gas effluent stream 140 or if the $H_2$:CO ratio in gas effluent stream 140 is lower than that needed to conduct the Fischer-Tropsch reactions, the catalytic partial oxidation product stream 120 may have an $H_2$:CO ratio which is lower than that needed to conduct the Fischer-Tropsch reactions in Fischer-Tropsch reactor 102. If that is the case, optional supplemental hydrogen stream 150 may be added to product stream 120 before it is fed into the Fischer-Tropsch reactor. It is contemplated that in many instances, the amount of supplemental hydrogen 150 needed will be greatly reduced, or even preferably eliminated, from that needed in the conventional system of FIG. 1. Thus, greatly reducing or eliminating the cost associated with providing that supplemental hydrogen. Additionally, even if the need for supplemental hydrogen is not reduced (e.g., because the $H_2$:CO ratios in the recycle stream is too low), the ability to recycle the methane from the FT effluent without the use of expensive separation techniques is extremely valuable.

In preferred embodiments the hydrogen is provided by a recycle stream from the Fischer-Tropsch reactor (e.g., gas effluent stream 140). A recycle stream could also come from other areas of the GTL plan such as product upgrading or anywhere hydrogen is produced or even from bottled or trucked-in hydrogen. Product upgrading can comprise, but is not limited to, the following processes, hydrocracking, hydroprocessing, hydrotreating, and the like, exemplary examples of which are know to one of ordinary skill in the art. The hydrogen can also come from a plant which dehydrogenates alkanes to produce olefins and hydrogen (e.g., ethane to ethylene), examples of which are well known in the art. In addition to hydrogen, CO, methane, light hydrocarbons, $CO_2$, and/or inerts such as, by way of example only, $N_2$ and Ar, could also be present. Applicants expect that the presence of carbon monoxide and carbon dioxide in the recycle stream will not have a substantial effect on the overall efficiency of the partial oxidation reactor. For example, Applicants believe that the introduction of carbon monoxide and carbon dioxide into the partial oxidation feed will have a slight negative effect (about a 2–4% decrease in conversion), however, it is expected that any negative effect will be more than outweighed by the elimination or substantial reduction in the need for the supplemental hydrogen, the need to separate the methane in the FT effluent, or the wasted methane in the FT effluent.

A primary benefit to this invention is to reduce the complexity of FT tail gas handling without destroying the unconverted $H_2$ and CO. The separation of $H_2$, inerts such as $N_2$ and Ar, CO and methane is difficult. Optimally, one would want to recycle $H_2$ and CO to the FT, purge the $N_2$ and Ar inerts and recycle methane to the syngas step. Complexity, cost and loss product to thermodynamics preclude this. The fact that the CPOX can handle the described recycle without destroying $H_2$ and CO is unique and very advantageous.

EXAMPLES

Experiments were conducted on a CPOX catalyst system with a feed gas pre-heat of 300° C. Tests reactions were run with the following feed compositions using bottled hydrogen and achieved the listed approximate $H_2$:CO molar ratios in the product stream (Table 1). In Run No. 1, the total feed stream flow rate was 3.5 SLPM. In all other runs, the total feed stream flow rate was 5.0 SLPM.

TABLE 1

| Run No. | $CH_4$ mol % | $O_2$ mol % | Bottled $H_2$ mol % | Products Stream $H_2$:CO molar ratio |
|---|---|---|---|---|
| 1 | 64 | 36 | 0 | ≈1.97 |
| 2 | 64 | 36 | 0 | ≈2.02 |
| 3 | 62 | 36 | 4 | ≈2.09 |
| 4 | 60 | 33 | 7 | ≈2.14 |
| 5 | 58 | 32 | 10 | ≈2.19 |
| 6 | 56 | 31 | 13 | ≈2.25 |

As can be easily determined from Table 1, the addition of bottled hydrogen to the partial oxidation feed stream is shown to increase the $H_2$:CO molar ratio in the partial oxidation product stream.

The term "catalyst system" as used herein means any acceptable system for catalyzing the desired reaction in the reaction zone. By way of example only, a CPOX catalyst usually includes a support and a catalyst. The support may be, for example, particulates, pills, beads, granules, pellets, rings, monoliths, ceramic honeycomb structures, wire gauze, or any other suitable supports in any acceptable manufactured shape such as those listed herein. The CPOX catalyst may be selected from the group consisting of nickel, samarium, rhodium, cobalt, platinum, rhodium-samarium, platinum-rhodium Ni—MgO, Group VIII metals, nickel-based catalysts, combinations thereof, or any other catalysts mentioned herein or as is well known in the art. The above-exemplified examples of supports and catalysts are only examples. There are a plethora of catalysts systems known in the art which would be acceptable and are contemplated to fall within the scope of the present invention, such as those disclosed in STRUCTURED CATALYSTS AND REACTORS 179–208, 599–615 (Andrzej Cybulski and Jacob A. Moulijn eds. 1998), incorporated herein by reference.

A stream is directly recycled, if it is sent from its source to its destination without being subjected to any processing which changes its composition. Conversely, a stream is indirectly recycled if it is subjected to composition changing processing after leaving its source but before arriving at its destination.

Should the disclosure of any of the patents and publications that are incorporated herein by reference conflict with the present specification to the extent that it might render a term unclear, the present specification shall take precedence.

Without further elaboration, it is believed that one skilled in the art can, using the description herein, utilize the present invention to its fullest extent. The embodiments herein are to be construed as illustrative, and not as constraining the disclosure in any way whatsoever.

We claim:

1. A method for conducting a partial oxidation reaction, the method comprising:

providing a catalytic partial oxidation reactor;

operating a dehydrogenation reaction so as to produce a hydrogen stream;

providing a feed stream comprising a hydrocarbon-containing gas, an oxygen-containing gas, and a hydrogen-containing gas, wherein at least a portion of said hydrogen-containing gas comprises at least a portion of the hydrogen produced in the dehydrogenation reaction; and feeding the feed stream through the partial oxidation reactor;

operating the partial oxidation reactor at conditions effective to partially oxidize at least a portion of the hydrocarbon-containing gas to a product stream comprising synthesis gas such that, the hydrogen fed to the catalytic partial oxidation reactor increases the $H_2$:CO molar ratio in the product stream.

2. The method of claim 1 wherein the hydrocarbon-containing gas comprises natural gas.

3. The method of claim 1 wherein the oxygen-containing gas is selected from the group consisting of substantially pure oxygen, oxygen-enriched air, and air.

4. The method of claim 1 wherein the hydrogen-containing gas comprises hydrogen and at least one inert gas.

5. The method of claim 1 wherein the hydrogen-containing gas comprises hydrogen, at least one inert gas, and CO.

6. The method of claim 1 wherein the hydrogen-containing gas comprises hydrogen, at least one inert gas, CO, and methane.

7. The method of claim 1 wherein the hydrogen-containing gas comprises hydrogen, at least one inert gas, CO, and light hydrocarbons.

8. The method of claim 1 wherein the hydrogen containing gas comprises hydrogen and light hydrocarbons.

9. The method of claim 1 wherein the hydrogen-containing gas comprises hydrogen, at least one inert gas, CO, and light hydrocarbons, and $CO_2$.

10. A method for convening a light hydrocarbon-containing gas to higher hydrocarbons, the method comprising:

providing a partial oxidation reactor feed stream comprising a light hydrocarbon-containing gas and an oxygen-containing gas;

providing a catalytic partial oxidation reactor;

feeding the partial oxidation reactor feed stream into the catalytic partial oxidation reactor;

operating the catalytic partial oxidation reactor at conditions which favor the partial oxidation of the light hydrocarbon to a product stream comprising synthesis gas;

providing a hydrocarbon synthesis reactor;

feeding at least a portion of the catalytic partial oxidation reactor product stream to the hydrocarbon synthesis reactor as a hydrocarbon synthesis feed stream;

operating the hydrocarbon synthesis reactor at conditions which favor the conversion of the hydrocarbon synthesis feed stream to higher hydrocarbons;

removing a gas effluent stream from the hydrocarbon synthesis reactor;

directly or indirectly recycling at least a portion of the effluent stream from the hydrocarbon synthesis reactor to the catalytic partial oxidation reactor, wherein the portion of the recycled effluent stream fed to the catalytic partial oxidation reactor comprises hydrogen and carbon monoxide;

including in the hydrogen-containing gas a hydrogen stream produced by dehydrogenation of alkanes; and feeding at least a portion of the recycled effluent stream through the catalytic partial oxidation reactor such that the hydrogen fed to the catalytic partial oxidation reactor increases the $H_2$:CO molar ratio of its product stream.

11. The method of claim 10 further comprising providing a supplemental hydrogen stream, wherein the supplemental hydrogen stream is combined with the partial oxidation reactor product stream before the partial oxidation reactor product stream is fed to the hydrocarbon synthesis reactor as the hydrocarbon synthesis reactor feed stream.

12. A The method of claim 10 wherein the light hydrocarbon-containing gas comprises natural gas.

13. The method of claim 10 wherein the oxygen-containing gas comprises substantially pure oxygen.

14. The method of claim 10 wherein the light hydrocarbon-containing gas comprises primarily methane.

15. The method of claim 10 wherein the hydrogen-containing gas comprises hydrogen and at least one inert gas.

16. The method of claim 10 wherein the hydrogen-containing gas comprises hydrogen, at least one inert gas, and CO.

17. The method of claim 10 wherein the hydrogen-containing gas comprises hydrogen, at least one inert gas, CO, and methane.

18. The method of claim 10 wherein the hydrogen-containing gas comprises hydrogen, at least one inert gas, CO, and light hydrocarbons.

19. The method of claim 10 wherein the hydrogen-containing gas comprises hydrogen, at least one inert gas, CO, light hydrocarbons, and $CO_2$.

20. The method of claim 10 wherein the recycling step is direct recycling.

21. The method of claim 10 wherein the recycling step is indirect recycling.

22. A method of convening a light hydrocarbon-containing gas to higher hydrocarbons, the method comprising:

providing a partial oxidation reactor feed stream comprising a light hydrocarbon-containing gas and an oxygen-containing gas;

providing a catalytic partial oxidation reactor;

feeding the partial oxidation reactor feed stream into the partial oxidation reactor;

operating the partial oxidation reactor at conditions which favor the partial oxidation of the light hydrocarbon to a product stream comprising synthesis gas;

providing a hydrocarbon synthesis reactor;

feeding at least a portion of the partial oxidation reactor product stream to the Fischer-Tropsch reactor as the hydrocarbon synthesis feed stream;

operating the hydrocarbon synthesis reactor at conditions which favor the conversion of the hydrocarbon synthesis feed stream to higher hydrocarbons;

removing a gas effluent stream from the hydrocarbon synthesis reactor;

obtaining a recycle stream comprising at least a portion of the gas effluent from the hydrocarbon synthesis reactor and an amount of hydrogen from produced in a dehydrogenation reactor; and recycling at least a portion of the recycle stream to the partial oxidation reactor.

23. The method of claim 1 wherein the hydrogen fed to the catalytic partial oxidation reactor passes through the catalytic partial oxidation reactor substantially unchanged.

24. The method of claim 1 wherein the feed stream comprises a $H_2:O_2$ molar ratio of between 0.11:1 and 0.42:1.

25. The method of claim 10 wherein the hydrogen fed to the catalytic partial oxidation reactor passes through the catalytic partial oxidation reactor substantially unchanged.

26. The method of claim 22 wherein the hydrogen in the recycle stream passes through the catalytic partial oxidation reactor substantially unchanged.

* * * * *

UNITED STATES PATENT AND TRADEMARK OFFICE
CERTIFICATE OF CORRECTION

PATENT NO. : 6,903,139 B2
DATED : June 7, 2005
INVENTOR(S) : Stephen R. Landis et al.

It is certified that error appears in the above-identified patent and that said Letters Patent is hereby corrected as shown below:

Column 5,
Line 37, "convening" should be -- converting --.

Column 6,
Line 37, "convening" should be -- converting --.

Signed and Sealed this

Eleventh Day of October, 2005

JON W. DUDAS
*Director of the United States Patent and Trademark Office*